Dec. 15, 1936.  C. McPHERSON  2,064,075
AUTOMATIC BELT DRIVEN CLUTCH MECHANISM
Filed Oct. 4, 1935

INVENTOR
Charles McPherson
By E. J. Fetherstonhaugh
ATTORNEY

Patented Dec. 15, 1936

2,064,075

UNITED STATES PATENT OFFICE 2,064,075

AUTOMATIC BELT DRIVEN CLUTCH MECHANISM

Charles McPherson, Verdun, Quebec, Canada, assignor to M. M. Drives Limited, Montreal, Quebec, Canada Application October 4, 1935, Serial No. 43,503

7 Claims. (Cl. 192—43)

The invention relates to an automatic belt driven clutch mechanism, as described in the present specification and illustrated in the accompanying drawing that forms part of the same.

The invention consists essentially of the driving connections formed through the automatic clutching and declutching of spurs mounted in thrust ways within the pulley, as pointed out in the claims for novelty following a description in detail of assembled parts and their operation.

The objects of the invention are to furnish for various purposes a pulley, in which the driving belt is automatically freed of its load and cannot be affected by sudden changes regarding direction and stops as clearly exemplified in driving mechanisms for operating generators used in train lighting equipments, where the shunting and reversing are both sudden and rough, requiring instantaneous accommodation to constantly changing conditions, such as the freeing of the pulley from the armature at the moment of trouble which avoids undue strain and insures an immediate pick up of the drive should direction be changed and in fact practically following the dictates of the car's movements without at any time taking chances of snapping the belt, to provide a pulley which will automatically run free of the armature on change of their relative speeds and continue running free until the speeds agree with each other and generally to provide a safe and efficient means of driving the electric generator for lighting the passenger cars and to eliminate as far as possible the loss of the belts and irregular driving and shock to the machine.

In the drawing, Figure 1 is an elevational view showing an axle driven driving mechanism, such as may be used in train lighting equipments.

Like numerals of reference indicate corresponding parts in the various figures.

Figure 1:
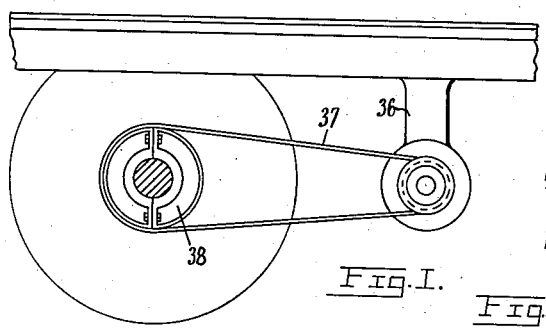
Figure 5:
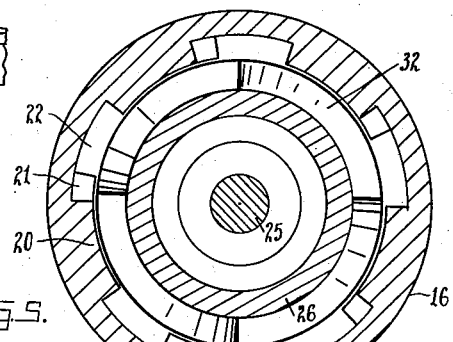
Figure 5 is a cross sectional view on the line 5—5 of Figure 4.
Figure 6:
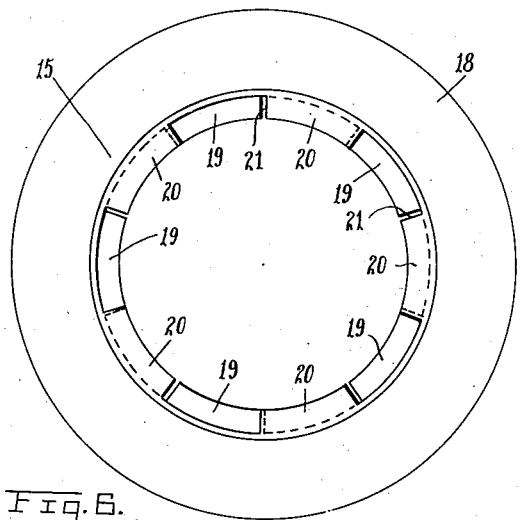
Figure 6 is an end view of the cylindrical casing.
Figure 2:
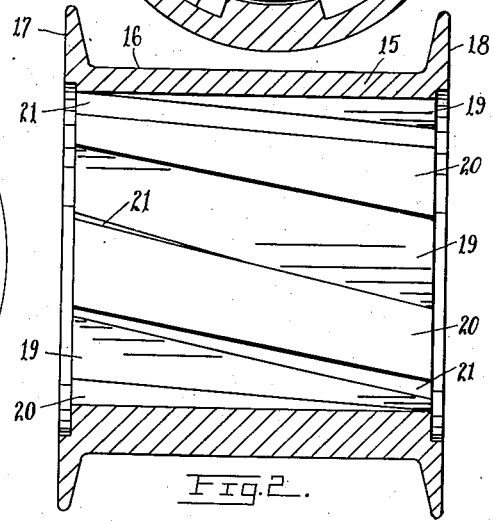
Figure 2 is a longitudinal sectional view of a cylindrical casing, constituting the peripheral member for the belt drive and showing the thrust ways thereinside.
Figure 4:
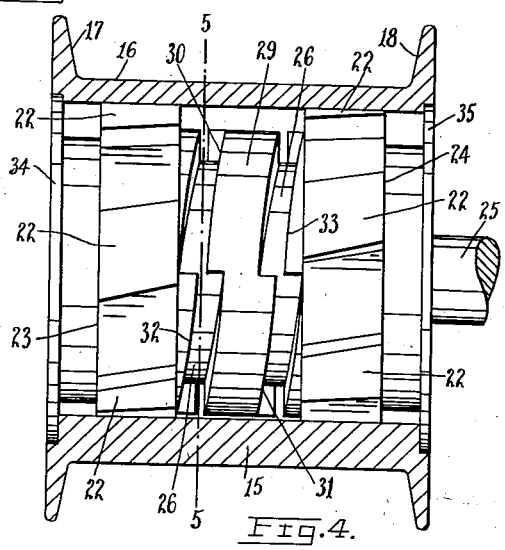
Figure 4 is a longitudinal sectional view of this cylindrical casing containing the clutch mechanism.
Figure 3:
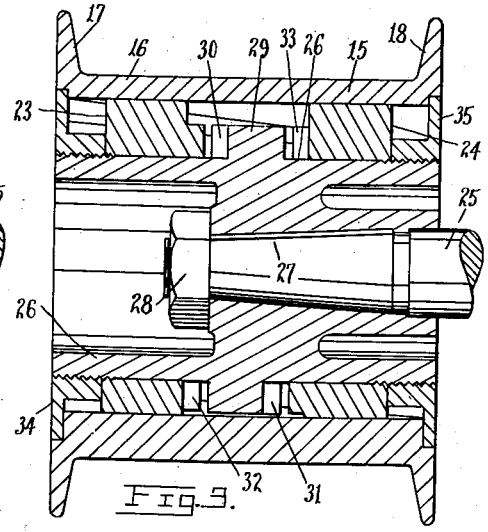
Figure 3 is a longitudinal sectional view of the cylindrical casing and clutch mechanism.

Referring to the drawing, the cylindrical casing, indicated by the numeral 15 is formed with the belt periphery 16, the flanges 17 and 18 and the interior wall, the thrust ways 19 along the inner wall extending from end to end of the casing and being circumferentially spaced by the ribbed construction 20.

The thrust ways 19 are of very extended arc formation, in other words, they are sections of a spiral formation, though here shown as shallow indeed in the matter of pitch.

The side walls 21 of the thrust ways are cut radially so that each thrust way is to all intents and purposes a dovetailed slot for retaining the dovetails 22 from the thrust pinions 23 and 24.

The driven shaft 25 is housed in the sleeve 26, this sleeve being non-rotatively held on the shaft 25 by the key 27 and secured by the nut 28. The thrust pinions 23 and 24 are slidably mounted on the sleeve 26.

The clutch member 29 projects radially from the sleeve 26 between the thrust pinions 23 and 24, in fact it is part with the sleeve and is a double clutch member having the face 30 on the one side and the face 31 on the other side, these faces coacting respectively with the clutch face 32 on the thrust pinion 23 and the clutch face 33 on the thrust pinion 24; in other words, these clutch members or spurs face one another and therefore drive the shaft in opposite directions, according to which one is clutching the member 29.

The dust cap 34 closes one end of the cylindrical casing and the dust cap 35 closes the other end and these dust caps form part with the sleeve 26, one cap being applied to one end and the other to the other end of the casing, in order to relieve the pulley of fastening nuts which are so readily lost.

In the operation of this invention, the dynamo shaft 25 is usually supported with the dynamo by a hanger 36 and driven by the belt 37 trained over a driving pulley 38, fastened on the car axle.

This dynamo furnishes the electric current for all the bulbs in a railway car as well as for fans and other paraphernalia requiring electric current.

The movement of the railway car operates the belt driving mechanism in which the pulley of this invention is included, and as this pulley is a cylindrical casing, the belt is trained over its periphery and so long as the train is going ahead, one of the faces of the clutch member will be engaged by one of the faces on a thrust pinion, the other thrust pinion being thrust out of mesh and free from the other clutch face during the driving of the one thrust pinion.

In the event that the brakes are applied to the train at any rate of speed, the momentum of the armature will carry the sleeve and mid-clutch member ahead of the thrust pinion, whose speed is reduced by the slowing up of the belt drive, the inclined faces of the clutch throwing the thrust pinion out of engagement allowing the armature to run free until its speed is reduced to that of the thrust pinion and pulley when it will again engage with the thrust pinion and drive the armature at the reduced speed of the driving pulley for the thrust on the thrust pinion is still directed towards the clutch member so long as the rotation of the pulley continues in the same direction.

In any change of direction of the car the belt and pulley will drive in the opposite direction and apply an opposite thrust on the thrust pinions forcing the one out of engagement and the other into engagement with the clutch member and rotating the armature in the opposite direction, the dynamo being constructed to operate with rotation of the armature in either direction.

It will now be seen that the pulley in its interior contains the necessary works to accommodate stopping suddenly by braking, change of direction and in fact all movements that the pulley is susceptible to making, for to be free suddenly on emergency braking simply removes all possibility of breaking belts or injuring the electrical machine, because the clutching mechanism is idle through the stoppage or slowing down of the main driving member.

Of course this is all changed when the drive is picked up again, and it matters not in which direction the main drive is operating.

What I claim is:—

1. In an automatic belt driven clutch mechanism, a peripheral member having lengthwise in its inner wall thrust ways circumferentially spaced, a driven shaft and common clutch member rotating fast therewith and spurs sliding in said ways to and from said clutch member and connecting the shaft at either side thereof respectively through to the peripheral member.

2. In an automatic belt driven clutch mechanism, a cylindrical casing having thrust ways from end to end in the inner wall surface, thrust pinions sliding in said ways, a driven shaft, a two faced clutch member keyed to said driven shaft and coacting with said thrust pinions and dust caps closing the ends of the casing.

3. In an automatic belt driven clutch mechanism, a cylindrical casing having thrust ways from end to end in the inner wall surface, in shape describing a wide arc and forming dovetail slots in cross section, thrust pinions sliding in said ways, a driven shaft, a two faced clutch member keyed to said shaft and coacting with said thrust pinions, and dust caps closing the ends of the casing.

4. In an automatic belt driven clutch mechanism, a cylindrical casing having thrust ways from end to end in the inner wall surface, and forming wide arcs spaced circumferentially, a driven shaft, a double clutch member keyed to said shaft with a thrust pinion clutch member on either side mounted in said ways and dust caps closing the ends of said casing.

5. In an automatic belt driven clutch mechanism, a cylindrical casing having angular thrust ways from end to end in the inner wall surface, thrust pinions sliding in said thrust ways having inwardly facing inclined clutch faces, a driven shaft, a double faced clutch member keyed to said shaft coacting with the clutch faces of said thrust pinions individually on rotation of said cylindrical casing in either direction.

6. In an automatic belt driven clutch mechanism, a cylindrical casing having angular thrust ways from end to end in the inner wall surface, a pair of thrust pinions having teeth engaging and sliding in said thrust ways and having central longitudinal bores, inclined clutch faces on the inner face of said thrust pinions, a sleeve mounted in said thrust pinions and freely rotatable therein and having a radial double clutch member thereon between the thrust pinions, a driven shaft keyed in said sleeve, and dust caps closing the ends of the casing and forming stops for said thrust pinions.

7. In an automatic belt driven clutch mechanism, a cylindrical casing having thrust ways from end to end in the inner wall surface, in shape describing a wide arc and cut to form slots in cross section, thrust pinions sliding in said ways and having central longitudinal bores, a sleeve rotatively mounted in said thrust pinions, a two faced clutch member projecting radially from said sleeve, a driven shaft keyed in said sleeve and coacting with said thrust pinions on rotation of said cylindrical casing and dust caps mounted on said sleeve and closing the ends of said casing.

CHARLES McPHERSON.